US007088297B2

(12) United States Patent
Nakano et al.

(10) Patent No.: US 7,088,297 B2
(45) Date of Patent: Aug. 8, 2006

(54) VEHICLE ROOF ANTENNA ATTACHMENT (75) Inventors: Kazuya Nakano, Tokyo (JP); Hiroyuki Maeda, Novi, MI (US); Katsushiro Ishibayashi, Novi, MI (US); Satoshi Nagasawa, Farmington Hills, MI (US)

(73) Assignee: Harada Industry Co., Ltd. (JP)

( * ) Notice: Subject to any disclaimer, the term of this patent is extended or adjusted under 35 U.S.C. 154(b) by 0 days.

(21) Appl. No.: 11/137,774

(22) Filed: May 26, 2005

(65) Prior Publication Data
US 2005/0237248 A1    Oct. 27, 2005

Related U.S. Application Data (63) Continuation of application No. PCT/JP04/17506, filed on Nov. 25, 2004.

(30) Foreign Application Priority Data
Nov. 25, 2003    (JP)    ............... 2003-394607

(51) Int. Cl.
*H01Q 1/32*    (2006.01)
(52) U.S. Cl. .................. 343/713; 343/711; 343/715; 403/197; 403/252
(58) Field of Classification Search ............... 343/711, 343/713, 715, 882; 403/197, 252
See application file for complete search history.

(56) References Cited

U.S. PATENT DOCUMENTS

| 2,265,179 | A |   | 12/1941 | MacDonald |
| 2,392,491 | A |   | 1/1946 | Moran |
| 2,496,938 | A |   | 2/1950 | Friedman |
| 2,524,534 | A | * | 10/1950 | Morris et al. ........... 174/153 A |
| 2,727,766 | A |   | 12/1955 | Grashow |
| 2,896,010 | A |   | 7/1959 | Newman |
| 3,138,660 | A |   | 6/1964 | Cejka |
| 3,138,661 | A |   | 6/1964 | Grashow |
| 3,336,828 | A |   | 8/1967 | Granger |
| 3,343,441 | A |   | 9/1967 | Van Buren, Jr. |
| 3,789,728 | A |   | 2/1974 | Shackelford |
| 4,136,986 | A |   | 1/1979 | Grashow et al. |
| 4,208,944 | A |   | 6/1980 | Moryl |
| 4,237,768 | A |   | 12/1980 | Volkmann |

(Continued)

FOREIGN PATENT DOCUMENTS

DE    196 40 110    4/1998

(Continued)

OTHER PUBLICATIONS

International Search Report, PCT/JP2004/017506, published Feb. 22, 2005.

*Primary Examiner*—Tho Phan
(74) *Attorney, Agent, or Firm*—Nixon & Vanderhye PC (57) ABSTRACT Comprised of an antenna base in which a protruding portion is formed on a bottom face and tapered faces are formed on shoulder portions of the protruding portion, a legged washer in which leg portions whose tip ends have an external diameter larger than the internal diameter of a mounting hole and which has an elasticity and leg portions, which are bent into a crank-like section so that the diameter of the tip ends is increased and in which the inside face of the crank portion makes contact with the tapered faces when the axial length of the bolt is decreased with respect to the antenna base by tightening the bolt so that the tip ends are expanded, are formed integrally with the ring portion, and a bolt which is fastened to the protruding portion of the antenna base through the legged washer.

19 Claims, 5 Drawing Sheets

U.S. PATENT DOCUMENTS

| | | | |
|---|---|---|---|
| 4,431,332 A * | 2/1984 | Dieges | 403/252 |
| 4,773,280 A | 9/1988 | Baumgarten | |
| 4,778,320 A | 10/1988 | Nakama | |
| 5,175,911 A | 1/1993 | Terrels et al. | |
| 5,507,585 A | 4/1996 | Diederich et al. | |
| 5,567,074 A | 10/1996 | Dovak et al. | |
| 5,583,522 A * | 12/1996 | Radomski et al. | 343/715 |
| 5,624,130 A | 4/1997 | Ricks | |
| 5,632,584 A | 5/1997 | Acevedo | |
| 6,039,523 A | 3/2000 | Kraus | |
| 6,236,377 B1 | 5/2001 | Hussaini et al. | |
| 6,264,393 B1 | 7/2001 | Kraus et al. | |
| 6,453,796 B1 | 9/2002 | Rocquet | |
| 6,486,841 B1 | 11/2002 | Imahigashi | |
| 6,560,819 B1 | 5/2003 | Mizuno et al. | |
| 6,714,171 B1 | 3/2004 | Haussler et al. | |
| 6,762,727 B1 | 7/2004 | Rochford et al. | |
| 7,002,523 B1 * | 2/2006 | Noro | 343/713 |
| 7,004,666 B1 * | 2/2006 | Kozlovski | 403/252 |
| 2003/0068198 A1 | 4/2003 | Kozlovski | |

FOREIGN PATENT DOCUMENTS

| | | |
|---|---|---|
| EP | 0 133 037 | 2/1985 |
| EP | 1 120 853 | 8/2001 |
| FR | 2 575 427 | 12/1984 |
| FR | 2 584 871 | 1/1987 |
| FR | 2 771 858 | 6/1999 |
| JP | 2001-036315 | 2/2001 |
| JP | 2002-164721 | 6/2002 |
| JP | 2004-282549 | 10/2004 |
| JP | PCT 2005/051720 | 6/2005 |
| WO | WO 00/35046 | 6/2000 |
| WO | WO 03/032436 A1 | 4/2003 |

* cited by examiner

//\# VEHICLE ROOF ANTENNA ATTACHMENT

CROSS REFERENCE TO RELATED APPLICATIONS

This is a Continuation Application of PCT Application No. PCT/JP2004/017506, filed Nov. 25, 2004, which was published under PCT Article 21(2) in Japanese.

This application is based upon and claims the benefit of priority from prior Japanese Patent Application No. 2003-394607, filed Nov. 25, 2003, the entire contents of which are incorporated herein by reference.

BACKGROUND OF THE INVENTION

1. Field of the Invention

The present invention relates to a vehicle roof antenna attachment taking into account the workability of installation on a vehicle roof panel.

2. Description of the Related Art

Conventionally, in an ordinary vehicle roof antenna attachment, a protruded portion formed on the bottom face of the antenna base plate is fitted to a bored portion formed in the vehicle roof panel, and by tightening the protruded portion which is protruded from the interior side of the vehicle with a nut or the like, the antenna base plate is fastened (for example, Jpn. Pat. Appln. KOKAI Publication No. 2001-036315).

BRIEF SUMMARY OF THE INVENTION

However, because the antenna base plate and the nut or the like to be tightened for fixing are provided separately and a work for fitting the nut or the like to a portion protruded through the roof panel from the interior side of the vehicle is needed, there is a possibility that the nut may drop out at the time of installation and the workability of installation become poor, thereby forcing a burden on a worker.

The present invention has been achieved in view of these situations and an object of the invention is to provide a vehicle roof antenna attachment which can be installed on a vehicle easily so as to reduce the burden on the worker.

DETAILED DESCRIPTION OF THE INVENTION

Figure 1:
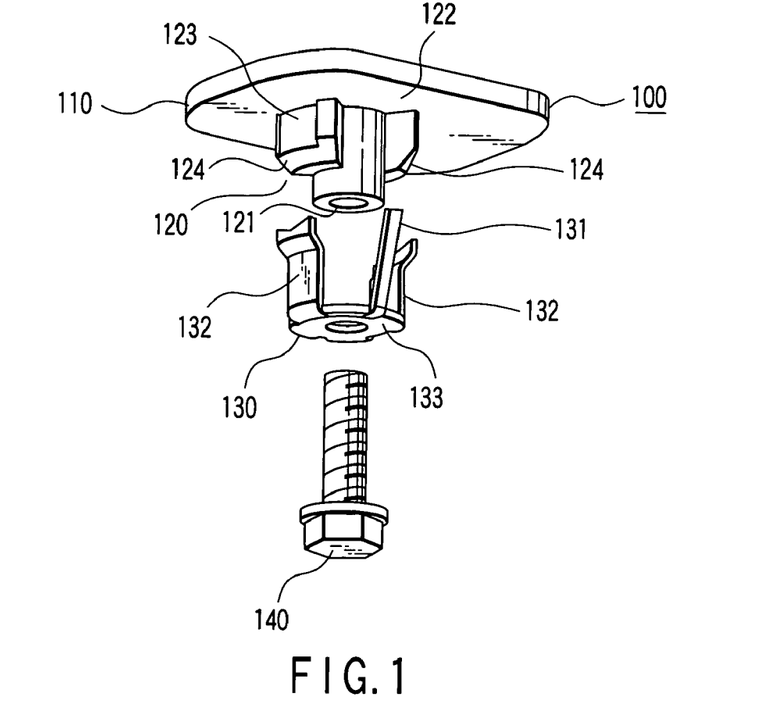
FIG. 1 is a perspective view showing an assembly configuration on an antenna base side of a vehicle antenna attachment according to a first embodiment of the present invention.
Figure 2:
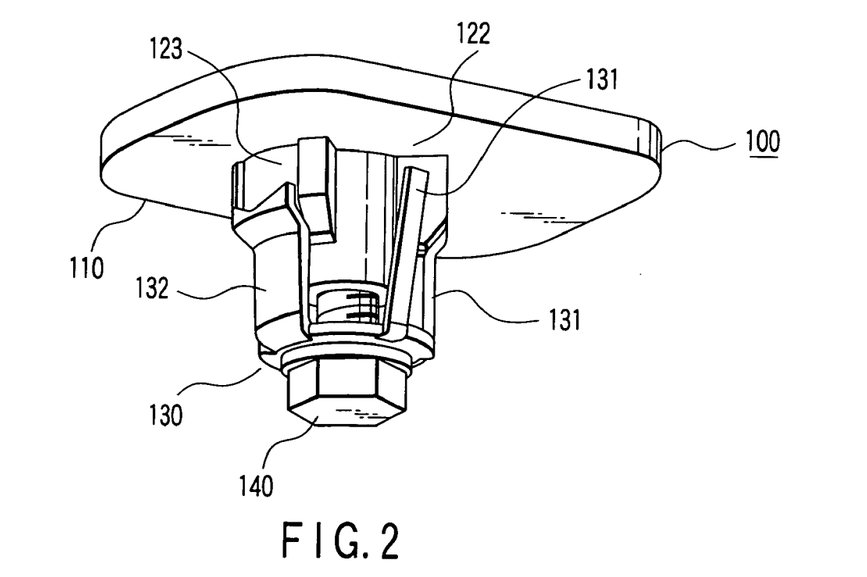
FIG. 2 is a perspective view showing an appearance configuration of an assembly state before temporary fastening of the first embodiment.
Figure 3:
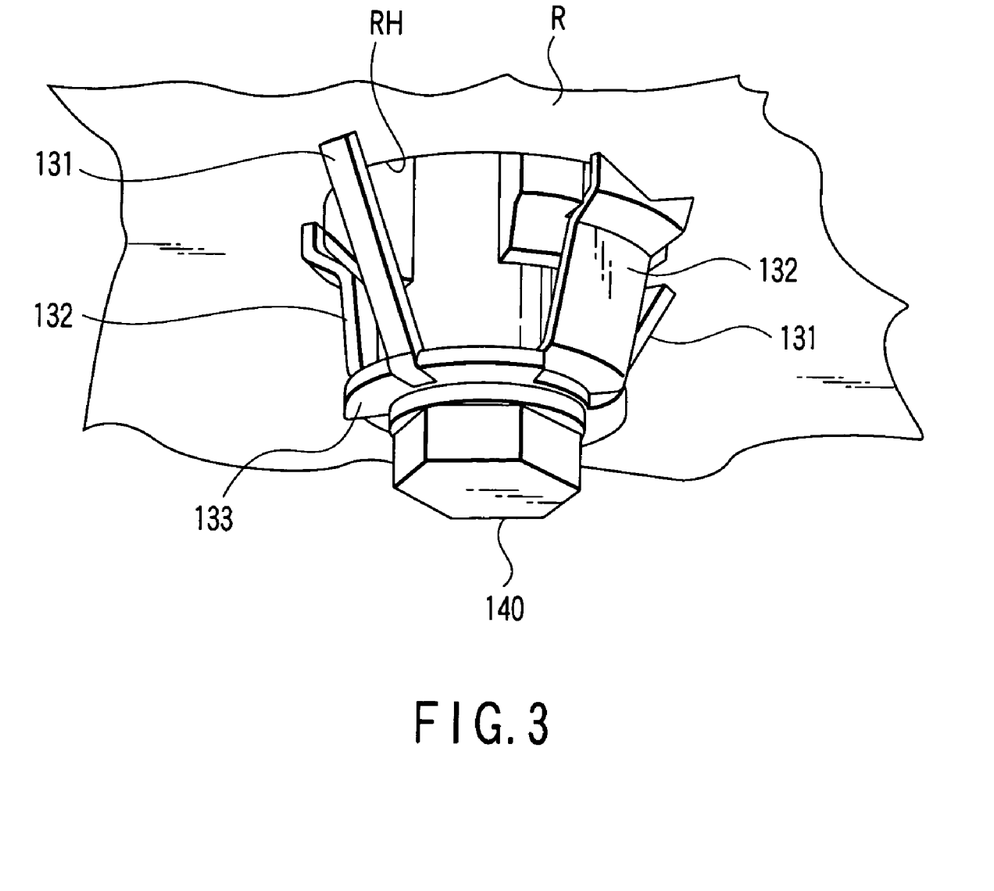
FIG. 3 is a perspective view showing an installation condition on a vehicle roof panel of the first embodiment.

FIGS. 1 to 3 show perspective views of a vehicle roof antenna attachment 100 according to a first embodiment of the present invention.

FIG. 1 is an exploded perspective view showing a configuration of components necessary for installation thereof to a vehicle roof panel R through a mounting hole RH. Reference numeral 110 in FIG. 1 denotes an antenna base and an antenna (not shown) is installed on its upper face side. A cylindrical protruding portion 120 composed of two stages for the installation is formed on the bottom face side of the antenna base 110.

An internal thread hole (first threaded portion) 121, to which a bolt 140 described later is to be fastened, is formed in a central shaft portion whose axial length is set longer than the periphery. This basic configuration is constituted of two stages of cylindrical form, one of which has a maximum external diameter which is slightly smaller with respect to the internal diameter of the mounting hole RH. Two pairs 122, 122, 123, 123 of roof-tile-like cutout portions are formed on the outer peripheral face in the side of the proximal portion whose diameter is larger such that the cutout portions are at right angles to each other on a plane perpendicular to the shaft portion.

Additionally, tapered faces 124, 124 are formed on the shoulder portions of one of the roof-tile-like cutout portions, 123, 123, whose cutout thickness is smaller and whose center angle is smaller.

A legged washer 130 is disposed so as to cover this protruding portion 120. This legged washer 130 has two pairs of first leg portions 131, 131 and second leg portions 132, 132 created by pressing punched-out metal material, for example, low-carbon steel, which are integrated with a washer ring 133.

The first leg portions 131, 131 whose width and thickness are both small while its lengths are large are disposed corresponding to the roof-tile-like cutout portions 122, 122 of the protruded portion 120 and the ends of these first leg portions 131, 131 are bent from the washer ring portion 133 such that they are expanded wider than the maximum external diameter on the proximal end of the protruding portion 120 and the internal diameter of the aforementioned mounting hole RH.

The second leg portions 132, 132 are larger in width than the first leg portions 131, 131 and have a width which allows them to be incorporated in the roof-tile-like cutout portions 123, 123 of the protruding portion 120. Portions slightly nearer to the tip ends with respect to the central portions of the second leg portions 132, 132 are formed such that they are bent in the shape of a crank and the tip end portions further increased in diameter are accommodated in the roof-tile-like cutout portions 123, 123.

Additionally, the respective tip ends of the second leg portions 132, 132 are so formed that both ends of each thereof are at sharp angle as shown in the same Figure in order to allow them to bite into the vehicle roof panel more firmly. A bolt 140 (tightening member) is used to fasten this legged washer 130 to the protruded portion 120 of the antenna base 110.

The second leg portions 132 and the washer rings 133 are formed with a thickness of about 1 mm and the first leg portion 131 is formed in the thickness of about 0.3 to 0.5 mm, for example. By setting the thickness of the first leg portion 131 less than 50% the thickness of the second leg portion 131, the first leg portion 131 can be deformed easily and the reason why it is set at 30% or more is to prevent the first leg portion from being deformed into a damage.

Subsequently, the mounting operation of the above-described embodiment onto the vehicle roof panel R will be described. FIG. 2 shows a state in which the antenna base 110 and the legged washer 130 are assembled by fastening them with the bolt 140 lightly before they are temporarily installed to the vehicle roof panel R to which an antenna base is to be mounted. With this state, the tip ends of the second leg portions 132, 132 of the legged washer 130 are accommodated in the roof-tile-like cutout portions 123, 123, so that there are no obstacles in inserting them into a hole portion drilled in the vehicle roof. In the leg portions 131, 131, their tip ends are expanded wider than the internal diameter of the hole portion drilled in the vehicle roof.

The lengths of the first leg portions 131, 131 are set so that in this assembly condition, the interval between the tip ends of the first leg portions 131, 131 and the flat portion of the antenna base 110 is as same as or larger than the thickness of the vehicle roof panel, which is an object.

Because these first leg portions 131, 131 are small enough in width and thickness, when an engineer inserts the protruding portion 120 of the antenna base 110 assembled with the legged washer 130 and the bolt 140 into the hole portion in the vehicle roof panel by making full use of the elasticity possessed by the low-carbon steel which is a material thereof, it is distorted inward temporarily accompanied by a slight resistance and when the tip end passes the vehicle roof panel R, it is expanded due to its elasticity.

Thus, when the protruding portion 120 of the antenna base 110 assembled with the legged washer 130 and the bolt 140 are inserted into the hole portion in the vehicle roof panel R as shown in FIG. 2, if the first leg portions 131, 131 of the legged washer 130 are expanded in the interior side of the vehicle, this antenna base 110 cannot be removed from the vehicle roof panel until the worker contracts the first leg portions 131, 131 of the legged washer 130 with his fingers from the interior side of the vehicle and pushes it out. This is a temporary installation of the antenna base.

Thereafter, if the worker tightens the bolt 140 from the interior side of the vehicle, the axial length of the bolt 140 to the antenna base 110 is decreased so that the entire legged washer 130 is pressed against the vehicle roof panel.

At this time, as for the second leg portions 132, 132 having a larger width of the legged washer 130, the inner faces of crank-like bent portions are pressed against the tapered faces 124, 124 of the protruding portion 120, so that the tip end portions are expanded gradually. Consequently, the interval between the both tip end portions is expanded wider than the internal diameter of the hole portion in the vehicle roof panel R and brought into contact with the vehicle roof panel R from the interior side of the vehicle.

FIG. 3 shows the relationship between the legged washer 130 and the vehicle roof panel R at this time, in which the tip ends of the second leg portions 132, 132 as well as those of the first leg portions 131, 131 are expanded largely so that they are kept in a firm contact with the interior side of the vehicle of the vehicle roof panel. At this time, the second leg portions 132, 132 are accommodated in the roof-tile-like cutout portions 123, 123 and fixed therein so as to restrict from rotating.

Although the first leg portions 131, 131 are expanded wider than the second leg portions 132, 132 because the lengths of their legs are larger, the width and thickness are set to smaller in order to provide with the elasticity as described above. Thus, they are not kept in contact with the bottom face of the vehicle roof panel R with a strength large enough for installation and fixing of the antenna base 110. In the meantime, the tip ends of the first leg portions 131, 131 are preferably formed to be a flat face but not a sharp edge. Therefore, the first leg portions 131, 131 does not bite into the vehicle roof panel R due to the relationship with the elasticity.

The second leg portions 132, 132 are in rigid structure having an excessive width, and when the bolt 140 is tightened firmly, its crank-like bent portions are expanded along the tapered faces 124, 124 so that the sharp angle tip ends come into a contact with the compartment side of the vehicle roof panel. For this reason, it has sufficient stiffness necessary for fixing the antenna base 110 to the vehicle roof panel R.

Additionally, because the tip ends of the second leg portions 132, 132 are so formed that the both ends are at sharp angle, they are allowed to bite into the vehicle roof panel R more firmly.

Even if the surface of the bottom face of the roof panel R is coated with paint or the like and this legged washer 130 is so constructed to serve as an electric transmission path such as a grounding as a part of the antenna, electric contact failure is prevented so that electric connection with the vehicle roof panel R is secured.

Further, in the central axial portion of the protruding portion 120 which is protruded from the bottom face of the antenna base 110, its axial length is set larger than the that of the periphery of the proximal portion, so that the tip end provides a stopper structure which prevents the bolt 140 from being tightened more than necessary, thereby indicating to a worker of the completion of the installation. As a result, tightening of the bolt 140 more than necessary by the worker is prevented preliminarily, so that it is possible to prevent the tip ends of the second leg portions 132, 132 from being expanded more excessively, in order to avoid reduction of the mounting strength to the vehicle roof panel R and electric contact failure.

In this case, the tip ends of the second leg portions 132, 132 are ideally brought into contact with the vehicle roof panel R substantially at right angles.

When with the antenna base 110 and the legged washer 130 fastened integrally with the bolt 140, the protruding portion 120 protruded from the bottom face of the antenna base 110 is inserted into the hole portion formed in the vehicle roof panel R from external side of the vehicle so that the first leg portions 131, 131 are expanded in the interior side of the vehicle so as to prevent itself from loosening out, the temporary installation is completed.

Only by tightening the bolt 140 from the in the interior side of the vehicle, the tip ends of the leg portions 132, 132 are expanded so as to nip the vehicle roof panel R firmly with the bottom face of the antenna base 110 and then, the installation on the vehicle can be finished.

Therefore, after the temporary fastening, the installation can be finished only by a very simple procedure of tightening the bolt 140 protruded to the interior side of the vehicle and because the bolt 140 is preliminarily assembled with the antenna base 110, it never drops into the interior side of the vehicle, thereby reducing a burden on the worker greatly.

In the above embodiment, it has been described that the legged washer 130 is integrally created by punching out and pressing a low-carbon steel with the respective stiffness of the first leg portions 131, 131 and the second leg portions 132, 132 being adjusted by adjusting their width and thickness. The above procedure makes it possible to manufacture the legged washer 130 having the first leg portions 131, 131 having a flexible structure and the second leg portions 132, 132 having a rigid structure very easily, thereby reducing manufacturing cost of the components.

In the meantime, although in the above embodiment, it has been described that the first leg portions 131, 131 having the flexible structure and the second leg portions 132, 132 having the rigid structure are both in pair, the present invention is not restricted to the example, but it is permissible to create at least three pieces of each thereof.

Figure 4:
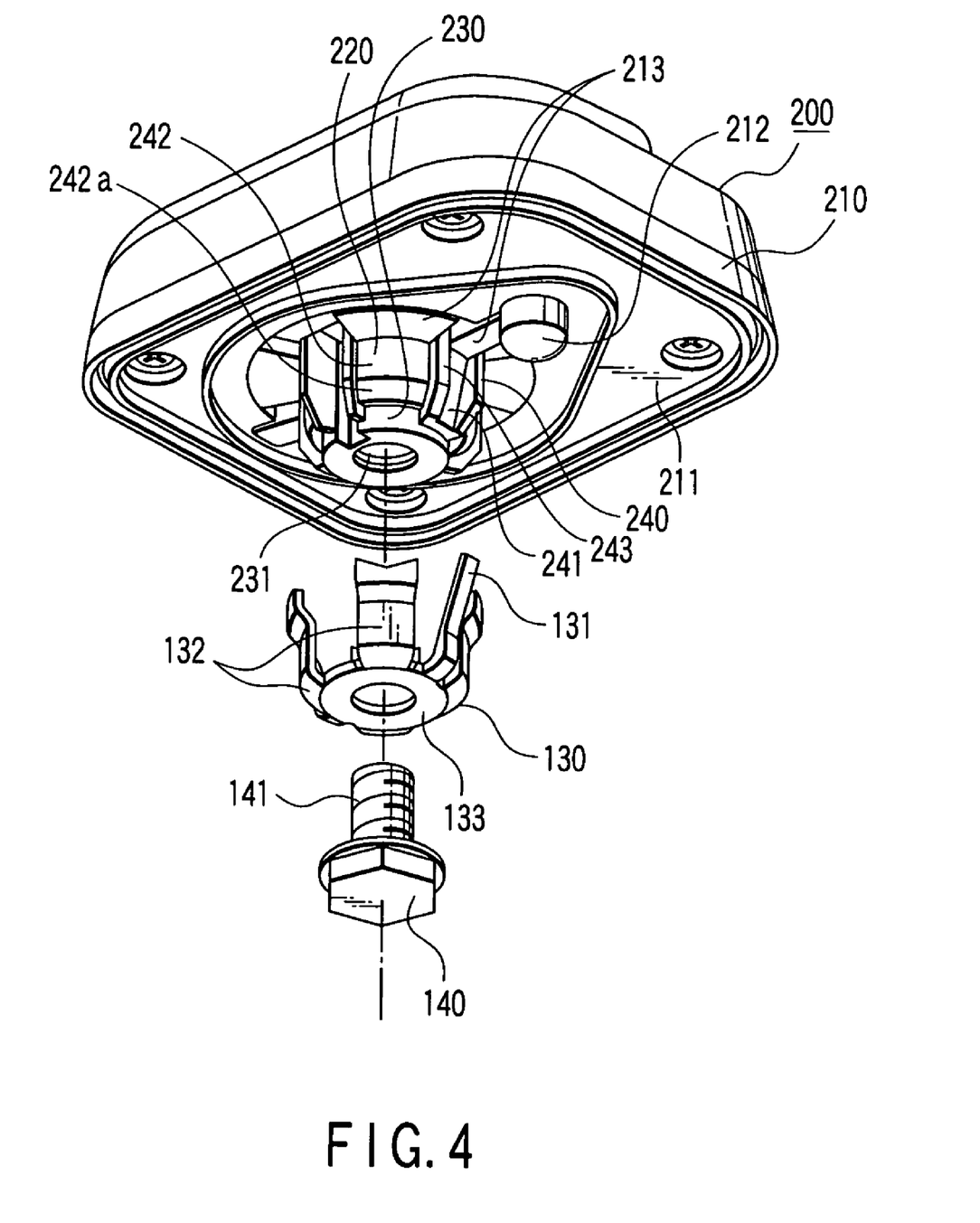
FIG. 4 is an exploded perspective view showing a vehicle roof antenna attachment according to a second embodiment of the present invention.

FIG. 4 is an exploded perspective view of a vehicle roof antenna attachment 200 according to a second embodiment of the present invention. The vehicle roof antenna attachment 200 is installed to the mounting hole RH formed in the vehicle roof panel R like the vehicle roof antenna attachment 100 according to the first embodiment. Because the legged washer 130 and the bolt 140 are the same as those of the first embodiment, detailed description thereof is not repeated here.

Reference numeral 210 in FIG. 4 indicates an antenna base, to which an antenna mast (not shown) is to be mounted and its bottom face 211 is brought into contact with the vehicle roof panel R. On the bottom face 211 of the antenna base 210 are formed a protrusion 212 which serves as a stopper for the antenna base 210 rotating and a protruding portion 220 which is protruded to the interior side of the vehicle through the mounting hole RH. Plural metal panels (contacting device) 213 in the form of a fan are provided around the protruding portion 220 on the bottom face 211. The length in the diameter direction of the metal panel 213 is set to a dimension corresponding to a range in which the tip end of the second leg portion 132 described later starts to contact the vehicle roof panel R and then reaches the termination.

The protruding portion 220 is constituted of two stages of a central shaft portion 230 which is long in its axial length and has a smaller diameter and an outer shaft portion 240 which is formed integrally around the central shaft portion 230, whose axial length is slightly shorter than the central shaft portion 230 and which has a larger diameter. The external diameter of the outer shaft portion 240 is slightly smaller than the mounting hole RH.

An internal thread hole (first threaded portion) 231 to which the bolt 140 is to be fastened, is formed in the central shaft portion 230. An external thread portion (second threaded portion), which is fastened to the internal thread portion 231, is formed in the shaft portion 141 of the bolt 140.

Two cutout portions 241 and four cutout portions 242 are formed in the outer shaft portion 240. Tapered faces 242a, which are expanded outward from the center side of the axial line, are formed on the cutout portions 242. A sheet-like portion 243 is formed between the cutout portion 241 and the cutout portion 242.

Next, the operation for mounting the vehicle roof antenna attachment 200 to the vehicle roof panel R will be described.

The legged washer 130 is installed to the protruding portion 220 by tightening the bolt 140 lightly. In this state, the tip ends of the second leg portions 132 of the legged washer 130 are accommodated in the cutout portions 242 of the protruding portion 220, so that no obstacle is generated for insertion into the mounting hole RH. Because a subsequent operation for mounting is substantially the same as the first embodiment described above, only different points will be described while detailed description of overlapping points is not repeated here.

As a result of tightening the bolt 140, the inside face of the crank-like bent portion of the second leg portion 132 is pressed against the tapered face 242a of the protruding portion 220.

Because in the second embodiment, the temporary installation can also be done with a simple operation and after that, the installation can be finished with a very simple operation of only tightening the bolt 140 protruding to the interior side of the vehicle, like the first embodiment, a burden on the worker can be reduced largely.

It comes that the tip ends of the first leg portion 131 and the second leg portion 132 strikes a portion in which the metal panel 213 is disposed across the vehicle roof panel R. Because the metal panel 213 is present, the vehicle roof panel R is never bent, resisting the pressing forces of the first leg portions 131 and the second leg portions 132. Therefore, the beautiful appearance is never damaged due to undulation of the vehicle roof and thus the working efficiency can be improved.

Further, because the second leg portions 132 make contact with the sheet-like portion 243 formed between the cutout portion 241 and the cutout portion 242, it serves as a stopper for a rotation of the legged washer 130 when the bolt 140 is tightened, thereby improving the work efficiency. Further, it is permissible to provide the central shaft portion 230 with a cutout and provide the legged washer 130 with a member which engages this cutout so as to secure a rotation stopping function.

Figure 5:
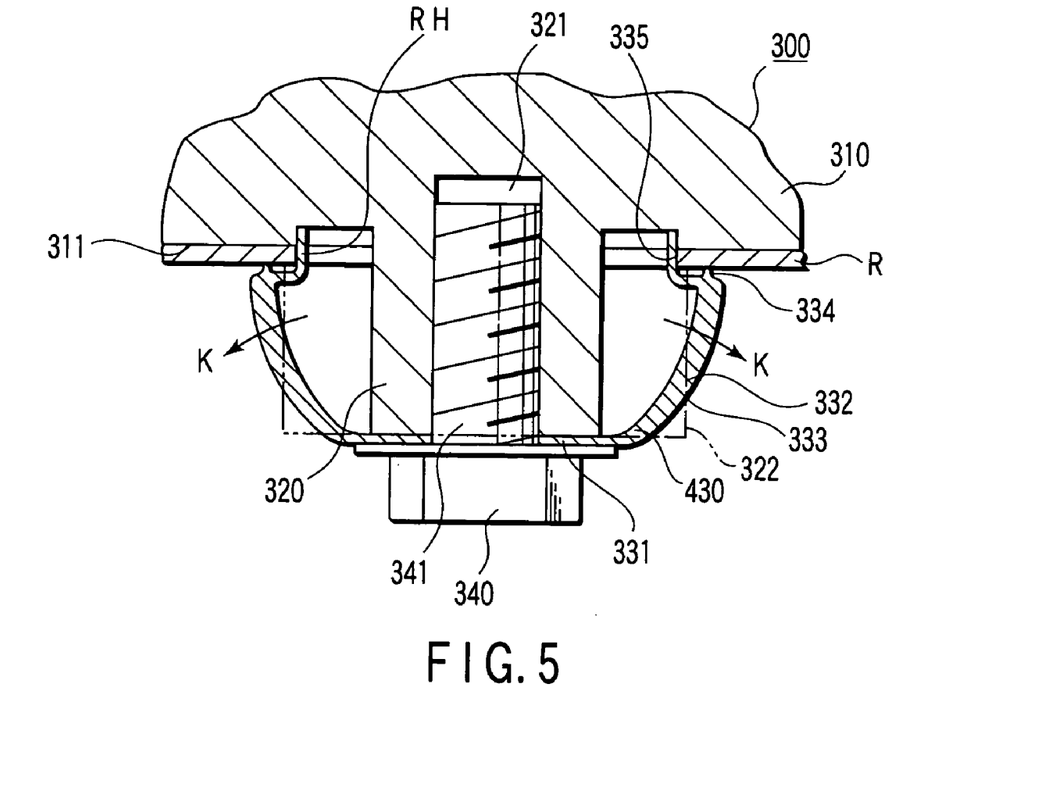
FIG. 5 is a sectional view showing a major portions of a vehicle roof antenna attachment according to a third embodiment of the present invention.
Figure 6:
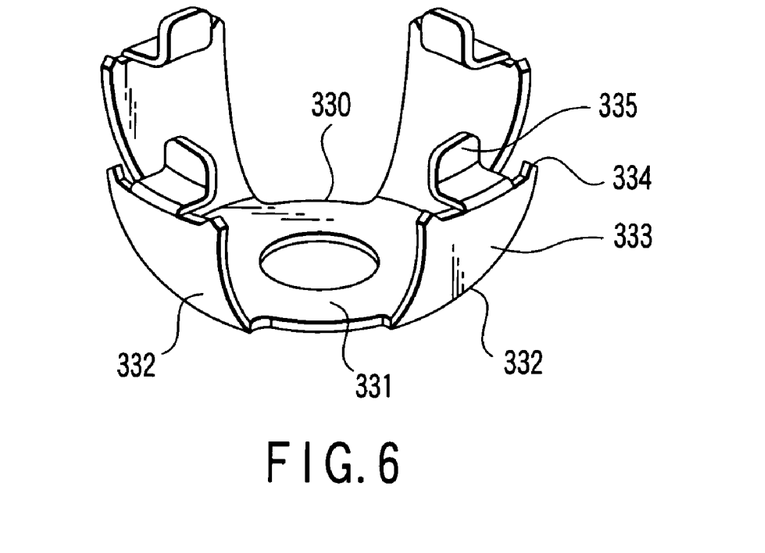
FIG. 6 is a perspective view showing a legged washer incorporated in the vehicle roof antenna attachment.

FIG. 5 is a sectional view showing major portions of a vehicle roof antenna attachment 300 according to a third embodiment of the present invention. FIG. 6 is a perspective view showing a legged washer 330 incorporated in the vehicle roof antenna attachment.

Reference numeral 310 in FIG. 5 denotes an antenna base, on which an antenna mast (not shown) is to be mounted while its bottom face 311 is kept in contact with the vehicle roof panel R. On the bottom face 311 of the antenna base 310, a protruding portion 320 which is protruded to the interior side of the vehicle is integrally formed through the mounting hole RH.

The protruding portion 320 is formed cylindrically and a thread hole (first threaded portion) 321, to which a bolt 340 described later is to be fastened, is formed in the center. A legged washer 330 is disposed so as to cover the protruding portion 320. The legged washer 330 is formed by punching out a metal material, for example, low-carbon steel, and then pressing. The legged washer 330 comprises a circular washer ring 331 and four leg portions extended from the outer edge of the washer ring 331 to the vehicle roof panel R side.

The leg portion 332 includes a leg portion main body 333 formed into the shape of a curved sheet which forms part of a spherical face, a pair of pawls 334 which are provided at the tip end of this leg portion main body 333 so as to bite into the vehicle roof panel more firmly, and an engaging portion 335.

To fasten this legged washer 330 to the protruding portion 320 of the antenna base 310, a bolt (tightening member) 340 is used. An external thread portion (second threaded portion) which is fastened to the aforementioned internal thread hole 321 is formed in a shaft portion 341 of the bolt 340.

Next, the operation for mounting the vehicle roof antenna attachment 300 onto the vehicle roof panel R will be described. First, the legged washer 330 is assembled with the protruding portion 320 by fastening the bolt 340 lightly. The leg portions 332 are expanded wider than the internal diameter of the mounting hole RH.

Next, the protruding portion 320 of the antenna base 310 assembled with the legged washer 330 and the bolt 340 is inserted into the mounting hole RH. At this time, they are distorted inward temporarily accompanied by a slight resistance by deforming elastically the leg portions 332 and when the tip ends thereof pass through the mounting hole completely, they are expanded again due to their elasticity.

Therefore, if the protruding portion 320 of the antenna base 310 assembled with the legged washer 330 and the bolt 340 is inserted into the mounting hole RH in the vehicle roof panel R and the leg portions 332 of the legged washer 330 are expanded again in the interior side of the vehicle, this antenna base 310 cannot be removed from the vehicle roof panel R until the worker contracts the leg portions 332 of the legged washer 330 with his fingers from the interior side of the vehicle and pushes them out and this is a temporary installation of the antenna base.

Thereafter, if the worker tightens the bolt 340 from the interior side of the vehicle, the axial length of the bolt 340 with respect to the antenna base 310 decreases so that the leg portion main body 332 is expanded outwardly (in the direction of an arrow K in the same Figure) and at the same time, the pawls 334 are pressed against the vehicle roof panel R and the engaging portions 335 are pressed against the bottom face 311 of the antenna base 310.

Thus if the surface of the bottom face of the vehicle roof panel R is coated with paint or the like and this legged washer 330 is so constructed to serve as an electric transmission path such as a grounding as a part of the antenna, electric contact failure is prevented so that electric connection with the vehicle roof panel R is secured. In this case, it is desirable that the pawls 334 are brought into contact with the vehicle roof panel R substantially at right angles.

Further, the engaging portions 335 are expanded wider toward the inner periphery of the mounting hole RH of the vehicle roof panel R as they are expanded so that they are engaged firmly. As a result, it comes that the bolt 340 cannot be tightened further, thereby informing a worker of the completion of the installation. Consequently, it is possible to prevent the worker from tightening the bolt 340 more than necessary, and thus it is possible to avoid reduction of the mounting strength to the roof panel R and electric contact failure originating from a further expansion of the tip ends of the leg portions 332.

In the protruding portion 320, its axial length is increased also and by bringing the tip ends thereof in contact with the washer ring 331, it acts as a stopper which prevents the bolt 340 from being tightened more than necessary.

With the antenna base 310 and the legged washer 330 assembled integrally with the bolt 340, the protruding portion 320 which is protruded from the bottom face of the antenna base 310 is inserted into the mounting hole RH formed in the vehicle roof panel R from external side of the vehicle and when the leg portions 332 are expanded in the interior side of the vehicle across the vehicle roof panel R so that they are inhibited from loosening out, the temporary installation is completed.

Thereafter, only by tightening the bolt 340 by a necessary amount from the interior side of the vehicle, the vehicle roof panel R is nipped firmly between the tip end of the leg portion 332 and the bottom face of the antenna base 310 and then, the installation onto the vehicle can be completed.

Thus, after the temporary installation, the installation work can be finished with only a very simple work of tightening the bolt 340 protruded to the compartment side of the vehicle. Because the bolt 340 is assembled with the antenna base 310 preliminarily, it never drops to the interior side of the vehicle, thereby making it possible to reduce a burden on the worker largely.

Further, if, as shown in two-dot and dash line 322 in FIG. 5, an engaging portion is provided protrudedly around the outer periphery of the protruding portion 320 so as to engage the leg portions 332, thus a stopper for rotation when the bolt 340 is tightened is formed. Thereby reducing a burden on the worker.

Figure 7:
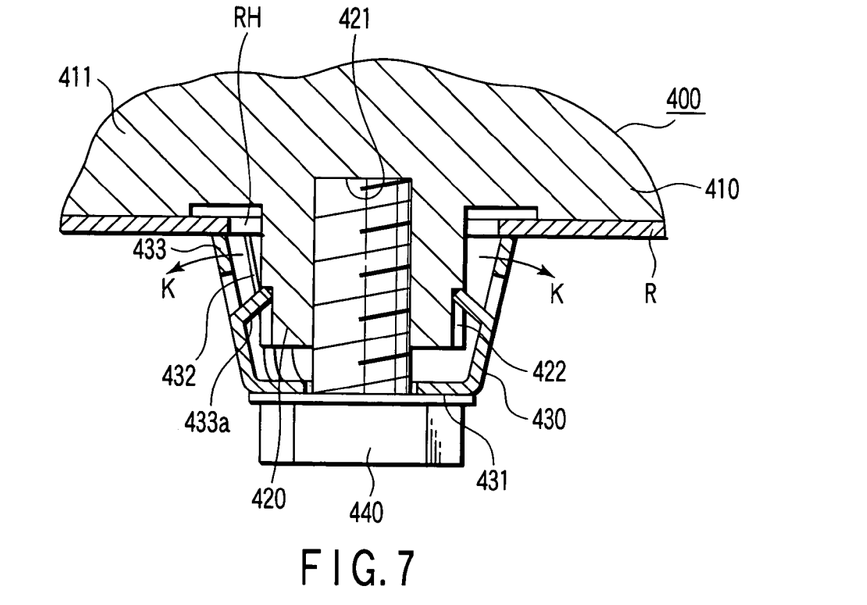
FIG. 7 is a sectional view showing major portions of a vehicle roof antenna attachment according to a fourth embodiment of the present invention.
Figure 8:
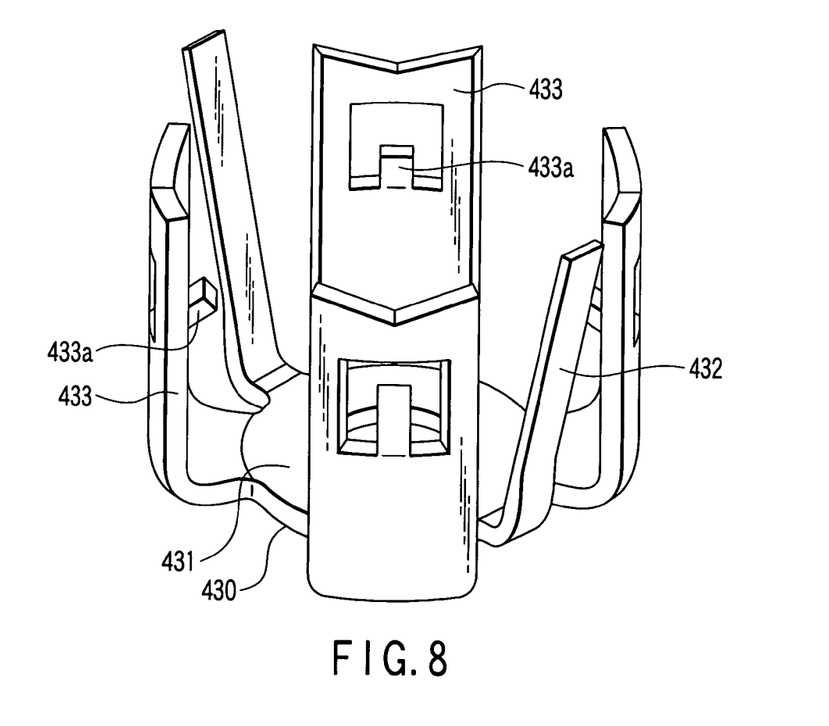
FIG. 8 is a perspective view showing a legged washer incorporated in the vehicle roof antenna attachment.

FIG. 7 is a sectional view showing major portions of a vehicle roof antenna attachment 400 according to a fourth embodiment of the present invention. FIG. 8 is a perspective view showing a legged washer 430 incorporated in the vehicle roof antenna attachment 400.

Reference numeral 410 in FIG. 7 denotes an antenna base, on which an antenna mast (not shown) is to be mounted and its bottom face 411 is kept in contact with the vehicle roof panel R. On the bottom face 411 of the antenna base 41 is formed integrally a protruding portion 420 which is protruded to the interior side of the vehicle through the mounting hole RH.

The protruding portion 420 is formed cylindrically and in the central portion are formed a thread hole (first threaded portion) 421, to which a bolt 440 described later is to be fastened, and a cutout portion 422 which a tongue piece 433a described later engages.

The legged washer 430 is disposed so as to cover this protruded portion 420. This legged washer 430 is formed by punching out a metal material, for example, low carbon steel and pressing. The legged washer 430 includes a circular washer ring 431 and a first leg portion 432 and second leg portion 433 extended from the outer edge of the washer ring 431 toward the vehicle roof panel R.

The first leg portion 432 is formed so that its tip end is expanded wider as it leaves away from the washer ring 431 and the radius of a circular obtained by joining their tip ends is formed to be larger than the internal diameter of the mounting hole RH. Further, the second leg portion 433 is a sheet-like member provided substantially at right angle to the washer ring 431 and the maximum diameter portion obtained by joining their tip ends is formed to be smaller than the mounting hole RH. The tip ends are formed into a sharp angle which allows themselves to bite into the vehicle roof panel R firmly. Further, the cutout portions are provided in the intermediate portion and the tongue pieces 433a are bent inward.

In the meantime, the first leg portion 432 is set to a smaller value in its width and thickness than the second leg portion 433 so as to provide with elasticity as described above.

The bolt (tightening member) 440 is used to fasten the legged washer 430 to the protruding portion 420 of the antenna base 410. An external thread portion (second threaded portion) which is fastened to the internal thread hole 421 is formed in the shaft portion 441 of the bolt 440.

Next, the operation for mounting the vehicle roof antenna attachment 400 onto the vehicle roof panel R will be described. First, the legged washer 430 is assembled with the protruding portion 420 by tightening the bolt 440 lightly. The maximum diameter portion of the first leg portion 432 is set larger than the internal diameter of the mounting hole RH.

Next, the protruding portion 420 of the antenna base 410 assembled with the legged washer 430 and the bolt 440 is inserted into the mounting hole RH. At this time, they are distorted inward temporarily accompanied by a slight resistance by deforming elastically the leg portions 432 and when the tip ends thereof pass through the mounting hole RH completely, they are expanded again due to their elasticity.

Therefore, if the protruding portion 420 of the antenna base 410 assembled with the legged washer 430 and the bolt 440 is inserted into the mounting hole RH in the vehicle roof panel R and the leg portions 432 of the legged washer 430 are expanded again in the interior side of the vehicle, this antenna base cannot be removed from the vehicle roof panel R until the worker contracts the leg portions 432 of the legged washer 430 with his fingers from the interior side of the vehicle and pushes them out and this is temporary installation of the antenna base.

Subsequently, if the worker tightens the bolt 440 from the interior side of the vehicle, the axial length of the bolt 440 with respect to the antenna base 410 decreases so that the leg portion main body 432 is expanded outwardly and the tip ends are pressed against the vehicle roof panel R. In the second leg portions 433, their tongue pieces 433a engage the cutout portions 422 in the protruding portion 420 so that entire the second leg portions 433 are expanded outwardly (in the direction of an arrow K in FIG. 7) and the tip ends are expanded wider than the internal diameter of the mounting hole RH. With this condition, the tip ends are pressed against the vehicle roof panel R.

Thus if the surface of the bottom face of the vehicle roof panel R is coated with paint or the like and this legged washer 430 is so constructed to serve as an electric transmission path such as a grounding as a part of the antenna, it can be connected electrically to the vehicle roof panel R so as to prevent contact failure. Meanwhile, for the second leg portions 433 to make contact with the vehicle roof panel R at an angle as near right angles as possible, it may be formed to be slightly inclined inward with respect to the washer ring 431.

If the tip end of the bolt 440 strikes the bottom of the thread hole 421, the bolt 440 cannot be tightened further, thereby informing a worker of the completion of the installation. Consequently, it is possible to prevent the worker from tightening the bolt 440 more than necessary, and thus it is possible to avoid reduction of the mounting strength to the roof panel R and electrical contact failure originating from a further expansion of the tip ends of the leg portions 332.

By increasing the axial length of the protruding portion 420 to make the tip ends into contact with the washer ring 431, it is permissible to provide a structure as a stopper, which inhibits the bolt 440 from being tightened more than necessary.

With the antenna base 410 and the legged washer 430 assembled integrally with the bolt 440, the protruding portion 420 which is protruded from the bottom face of the antenna base 410 is inserted into the mounting hole RH formed in the vehicle roof panel R from external side of the vehicle and when the leg portions 432 are expanded in the interior side of the vehicle across the vehicle roof panel R so that they are inhibited from loosening out, the temporary installation is completed.

Thereafter, only by tightening the bolt 440 by a necessary amount from the interior side of the vehicle, the vehicle roof panel R is nipped firmly between the second leg portion 433 and the bottom face of the vehicle roof panel R and then, the installation onto the vehicle can be completed.

Thus, after the temporary installation, the installation work can be finished with only a very simple work of tightening the bolt 440 protruded to the compartment side of the vehicle. Because the bolt 440 is assembled with the antenna base 410 preliminarily, it never drops to the interior side of the vehicle, thereby making it possible to reduce a burden on the worker greatly.

In the vehicle roof antenna attachment 400 according to the fourth embodiment, the second leg portions 433 are expanded by engaging the tongue pieces 433a with the protruding portion 420. However, it is permissible to expand the second leg portions 433 with other methods. For example, by forming the central portion of the washer ring 431 such that it is inclined to depart from the antenna base 410, when the bolt 440 is tightened, the central portion of the washer ring 431 is pressed so that the second leg portions 433 are expanded.

Meanwhile although for the vehicle roof antenna attachment of the respective embodiments, the bolt is exemplified as a tightening member, a nut-like one in which an internal thread is formed is also acceptable. Therefore, in this case, the protruding portion is provided as a bolt in which not the thread hole but an external thread is formed.

The present invention is not restricted to the above embodiments but may be modified in various ways within the scope without departing from the gist thereof. Further, the above respective embodiments include various stages of the inventions and the various kinds of the inventions can be extracted depending on an appropriate combination of disclosed plural components. For example, even if some components are deleted from all the components indicated in the embodiments, if at least one of the objects described in the column on the problem to be solved by the invention can be solved so that at least one of the effects described in the column on the effect of the invention is obtained, the configuration of the invention from which this component is deleted can be extracted as an invention.

This invention can provide a vehicle roof antenna attachment which can be installed on the vehicle roof panel with a very simple work of only tightening the tightening member such as the bolt protruded inside the compartment of the vehicle, thereby reducing a burden on the worker greatly.

What is claimed is:

1. A vehicle antenna attachment to be installed and fixed with a vehicle roof panel nipped from vehicle compartment side by inserting part thereof into a mounting hole formed in the vehicle roof panel from external side of the vehicle, comprising:

an antenna base disposed on external side of the vehicle with respect to the vehicle roof panel;

a protruding portion which is formed on the face on the side of the vehicle roof panel of the antenna base and to be inserted into the mounting hole while tapered faces expanded from the tip end side thereof to the proximal end side and a first threaded portion are formed on at least part of an outer peripheral portion thereof;

a tightening member having a second threaded portion which fastens to the first threaded portion and to be tightened to the protruding portion; and a legged washer comprised of a sheet-like washer ring through which the tightening member passes, a first leg portion which is extended from this washer ring toward the mounting hole and whose tip ends are formed to be larger than the internal diameter of the mounting hole and has an elasticity, and a second leg portion which is extended from the washer ring toward the mounting hole and whose part of the inside face makes contact with the tapered face as the washer ring approaches the mounting hole when the tightening member is tightened so that the tip ends are expanded outward of the mounting hole.

2. The vehicle roof antenna attachment according to claim 1, wherein the legged washer is so constructed that the thickness of the first leg portion is 30 to 50% the thickness of the second leg portion.

3. The vehicle roof antenna attachment according to claim 1, wherein the antenna base is provided with contacting devices, which are formed at positions corresponding to the tip ends of at least one of the first leg portion and the second leg portion.

4. The vehicle roof antenna attachment according to claim 1, wherein the legged washer is formed integrally by punching out metallic material.

5. The vehicle roof antenna according to claim 1, wherein the tightening amount of the tightening member is restricted by a contact between the protruding portion and the washer ring.

6. The vehicle roof antenna according to claim 1, wherein the tip ends of the leg portions have a portion whose both ends are formed at a sharp angle.

7. The vehicle roof antenna attachment according to claim 1, wherein the protruding portion is provided with a stopper for the rotation of the legged washer.

8. A vehicle antenna attachment to be installed and fixed with a vehicle roof panel nipped from vehicle compartment side by inserting part thereof into a mounting hole formed in the vehicle roof panel from external side of the vehicle, comprising:
   an antenna base disposed on external side of the vehicle with respect to the vehicle roof panel;
   a protruding portion which is formed on the face on the side of the vehicle roof panel of the antenna base and to be inserted into the mounting hole and in which a first threaded portion is formed;
   a tightening member having a second threaded portion which fastens to the first threaded portion and is to be tightened to the protruding portion; and
   a legged washer comprised of a sheet-like washer ring through which the tightening member passes, a first leg portion which is extended from this washer ring toward the mounting hole and whose tip ends are formed to be larger than the internal diameter of the mounting hole and has an elasticity, and a second leg portion which is extended from the washer ring toward the mounting hole and whose tip ends are capable of being accommodated in the internal diameter of the mounting hole, and a bent portion which is formed on at least one of the washer ring and the second leg portion so as to expand the tip ends of the second leg portions outward of the mounting hole when the tightening member is tightened.

9. The vehicle roof antenna attachment according to claim 8, wherein the antenna base is provided with contacting devices, which are formed at positions corresponding to the tip ends of at least one of the first leg portion and the second leg portion.

10. The vehicle roof antenna attachment according to claim 8, wherein the legged washer is formed integrally by punching out metallic material.

11. The vehicle roof antenna according to claim 8, wherein the tightening amount of the tightening member is restricted by a contact between the protruding portion and the washer ring.

12. The vehicle roof antenna according to claim 8, wherein the tip ends of the leg portions have a portion whose both ends are formed at a sharp angle.

13. The vehicle roof antenna attachment according to claim 8, wherein the protruding portion is provided with a stopper for the rotation of the legged washer.

14. A vehicle antenna attachment to be installed and fixed with a vehicle roof panel nipped from vehicle compartment side by inserting part thereof into a mounting hole formed in the vehicle roof panel from external side of the vehicle, comprising:
   an antenna base disposed on external side of the vehicle with respect to the vehicle roof panel;
   a protruding portion which is formed on the face on the side of the vehicle roof panel of the antenna base and to be inserted into the mounting hole and in which a first threaded portion is formed;
   a tightening member having a second threaded portion which fastens to the first threaded portion and is to be tightened to the protruding portion; and
   a legged washer comprised of a washer ring through which the tightening member passes and first leg portions having a projecting portion and extended from this washer ring toward the mounting hole and in which at least part between the tip end portion and the proximal end portion is disposed outside of the internal diameter of the mounting hole and whose tip ends are disposed in the internal diameter of the mounting hole and a contacting pawls provided on the outer face of the first leg portion and between the projecting portion and the tip end.

15. The vehicle roof antenna attachment according to claim 14, further comprising a restricting portion provided on the tip end of the first leg portion and for restricting the tip ends from being expanded wider than the internal diameter of the mounting hole.

16. The vehicle roof antenna attachment according to claim 15, wherein the legged washer is formed integrally by punching out metallic material.

17. The vehicle roof antenna according to claim 15, wherein the tightening amount of the tightening member is restricted by a contact between the protruding portion and the washer ring.

18. The vehicle roof antenna according to claim 15, wherein the tip ends of the leg portions have a portion whose both ends are formed at a sharp angle.

19. The vehicle roof antenna attachment according to claim 15, wherein the protruding portion is provided with a stopper for the rotation of the legged washer.

* * * * *